United States Patent
Sesay et al.

(10) Patent No.: US 6,454,962 B1
(45) Date of Patent: Sep. 24, 2002

(54) ELIXIR FOR REMOVING METALS FROM WASTEWATER

(75) Inventors: Sahid Sesay, Alameda; Edison Mbayo, San Jose, both of CA (US)

(73) Assignee: Baffin, Inc., Alameda, CA (US)

( * ) Notice: Subject to any disclaimer, the term of this patent is extended or adjusted under 35 U.S.C. 154(b) by 23 days.

(21) Appl. No.: 09/664,841

(22) Filed: Sep. 19, 2000

(51) Int. Cl.⁷ .................................................. C02F 1/56
(52) U.S. Cl. ........................ 252/181; 210/716; 210/728; 210/912; 252/180
(58) Field of Search ................................ 210/725, 727, 210/728, 723, 724, 735, 736, 716; 252/175, 180, 181

(56) References Cited

U.S. PATENT DOCUMENTS

| | | | | |
|---|---|---|---|---|
| 4,415,467 A | * | 11/1983 | Piepho | 252/181 |
| 4,450,092 A | * | 5/1984 | Huang | 252/181 |
| 4,800,039 A | * | 1/1989 | Hassick et al. | 252/181 |
| 5,200,089 A | * | 4/1993 | Siefert et al. | 210/725 |
| 5,614,102 A | * | 3/1997 | Sakurada | 210/718 |
| 6,120,690 A | * | 9/2000 | Haase | 210/728 |
| 6,171,506 B1 | * | 1/2001 | Allen et al. | 210/728 |
| 6,184,257 B1 | * | 2/2001 | Hassick | 514/769 |

* cited by examiner

Primary Examiner—Peter A. Hruskoci
(74) Attorney, Agent, or Firm—Lyon & Lyon LLP

(57) ABSTRACT

An elixir for treating wastewater by transforming metals into metal sulfates and sulfides, breaking up chelated metals, and precluding the metal sulfates and sulfides from redissolving back into the wastewater. The elixir comprises: 1) ferrous sulfate heptahydrate, 2) aluminum sulfate, 3) 75% sulfuric acid, 4) a blend of aluminum salts and a polymeric coagulant, and 5) water.

7 Claims, No Drawings

ELIXIR FOR REMOVING METALS FROM WASTEWATER

FIELD OF THE INVENTION

This invention pertains to the field of removing contaminants from a liquid, including, more specifically, removing heavy metals from industrial wastewater.

BACKGROUND OF THE INVENTION

Many industrial processes produce wastewater streams that are laden with contaminants. These industrial processes include, among others, electroplating, galvanizing, anodizing, chelating, metal finishing, printed circuit board (PCB) manufacturing, semiconductor, magnetic disk manufacturing, mining operations photo processing, fungicide manufacturing, food preparation, paper and pulp, textile, and oil refining. The wastewater streams of these different processes may contain any number of contaminants, including heavy metals, organic wastes, and inorganic wastes. In regard to heavy metal contaminants, they generally include, but are not limited to, metals such as copper, iron, gold, lead, nickel, silver, tin, zinc, chromium, cadmium, and arsenic.

The presence of these metals in wastewater causes the wastewater to be highly toxic. They can make the wastewater corrosive, inflammable, and even explosive. Due to the toxicity of metal laden wastewater, it poses a real danger of damaging wastewater collection systems, such as publicly owned treatment works (POTW), and of harming the environment.

In order to address the risks that metal laden wastewater presents, strict regulations have been imposed on plants regarding their wastewater discharges. Various agencies currently set maximum limits on the quantity of metals that plants may discharge into their waste streams. Where a plant discharges its wastewater to a POTW, these maximum limits are set either by the POTW itself, or by a municipal agency. And where a plant is discharging its wastewater directly to the environment, the maximum limits are typically set by state regulatory agencies and/or the Environmental Protection Agency.

Because of this need to minimize the quantity of metals discharged, plants treat their wastewater streams to remove the majority of the metals present. Since each metal has an optimum pH at which it will precipitate out of wastewater, plants have conventionally removed these metals individually using hydroxide precipitation over a series of pH adjustments, or by segregating waste streams that contain different metals and treating them individually. At each pH adjustment, at least one metal present in the wastewater will react with the treatment chemicals that have been added and will precipitate out of the wastewater. The metal precipitates must also be given a sufficient amount of time to settle out. The wastewater is then moved to another tank for the next pH adjustment. The wastewater must be moved to a new tank because once the pH level is changed, the metal that was just removed will have a tendency to re-dissolve back into solution.

For example, metals such as iron precipitate out of solution at lower pH levels, while metals such as nickel and cadmium precipitate out at higher pH levels. At a lower pH level, iron will precipitate out of solution, but if the pH level is then increased in order to remove other metals, the iron will dissolve back into solution. To solve this problem the wastewater is typically moved to a new treatment tank after a pH adjustment, leaving behind the metal that just precipitated out.

One drawback of known treatment processes is the length of time the precipitation of metals normally takes. Known methods chemically treat each metal separately, which requires many pH adjustments. In addition, the use of existing coagulants in known systems causes the metals to settle out slowly. Furthermore, known systems typically require a final pH adjustment prior to discharge. Thus the end result of all of these potential bottlenecks is that the entire operation may take anywhere from several hours to several days to complete.

Another drawback of known treatment systems is that when a plant generates several waste streams that each contain different metals, the waste streams are treated separately due to the problems involved in treating wastewater with multiple metals. This either forces a plant to implement more than one wastewater treatment system, or forces a plant to treat its waste streams one at a time. These limited options cause the plant to incur additional time and expense to treat all of its wastewater.

The fact that these processes can also be labor-intensive adds another source of time consumption. For example, plant operators often have to manually determine pH levels and manually add acid or base to adjust the pH levels, especially when spikes in metal concentrations occur. In addition, the chemicals that are added to the wastewater to precipitate out the metals can be in either solid or liquid form. This makes the addition of these chemicals into treatment tanks a more time-consuming process because operators typically add the solid chemicals manually, or have to initially mix the solid chemicals into clean water prior to adding it into the wastewater.

Another drawback to known systems is the fact that a plant's treatment process normally has to be tailored to the specific composition of that individual plant's wastewater so that it effectively removes the metals present. Generally, plants cannot simply implement an "off-the-shelf" process for treating their wastewater. Instead, plants typically have to design a treatment process around their effluent streams. This means that in the event of a system upset, for example higher levels of a metal or the introduction of a new metal in the wastewater, the treatment process will typically be less effective or ineffective altogether. The unfortunate result of this may be an unlawful discharge of metals. Thus, plants must continuously monitor the composition of their wastewater streams and modify the treatment processes and the chemicals they use to effectively treat their wastewater.

Other drawbacks of known systems relate to flocculation and coagulation when known flocculants and coagulants are mixed into the wastewater. Coagulation is the process of combining the suspended metal solids, typically in the form of colloids or flocs, into larger and heavier particles. These larger particles become too heavy to remain suspended in the wastewater and drop to the bottom of the solution. A slightly different process that has similar results is flocculation, which is the process of physically trapping and/or linking the flocs together, typically through the use of a polymer. In known systems, one drawback is that most polymers are supplied in powder form, requiring the users to mix the powder into water prior to adding it into the wastewater. This is labor-intensive and time consuming process. Another drawback is that when flocculants are mixed into the wastewater, their flocculation effects are retarded by the mixing blades which tend to break-up the flocs that form. This results in sludge which is difficult to remove from the wastewater and from filters. In addition, the difficulty of removing sludge from filters is exacerbated by the fact that often, due to the use of high quantities of lime, the sludge is slimy and clings to filters, resulting in a high filter replacement rate.

Accordingly, there is a need for a process to remove metals from wastewater that is less time consuming and does not need to be specifically tailored for the wastewater composition of each plant in which it is used, and that also addresses the other drawbacks of known systems that were mentioned above.

SUMMARY OF THE INVENTION

The present invention is a liquid chemical formulation that addresses some of the problems with known systems mentioned herein. Specifically, the elixir of the present invention removes metals from wastewater and comprises: 1) ferrous sulfate heptahydrate, 2) aluminum sulfate, 3) a 75% solution of sulfuric acid, 4) a chemical blend that comprises aluminum salts and a polymeric coagulant, and 5) water.

DETAILED DESCRIPTION OF THE INVENTION

The elixir of the present invention causes a number of different reactions to occur in wastewater that ultimately result in the removal of heavy metals. The elixir transforms soluble metal ions and other soluble metals into metal sulfates and sulfides, and then the elixir bonds to these metal sulfates and sulfides to preclude them from dissolving back into the wastewater solution. The elixir of the present invention also breaks up highly soluble chelated metals.

It is important to note that other reactions in the wastewater may also occur due to the elixir of the present invention, and the reactions outlined herein should be construed as exemplary and not as being the only reactions that occur. In addition, although this specification addresses the removal of metals from wastewater, the elixir of the present invention may also be used to remove other contaminants, including organic and inorganic contaminants. Finally, the elixir of the present invention is preferably used in conjunction with the system disclosed in co-pending U.S. Patent Application entitled "HIGHLY ACCELERATED PROCESS FOR REMOVING CONTAMINANTS FROM LIQUIDS", Lyon & Lyon docket number 247/251.

The elixir of the present invention preferably comprises a mixture of four different compounds that are all added to a relatively large volume of water. The first two compounds are preferably sulfates. In a presently preferred embodiment, the two sulfates are ferrous sulfate, preferably in the form of ferrous sulfate heptahydrate ($FeSO_4$—$7H_2O$), and aluminum sulfate.

When added to metal laden wastewater, the sulfates tend to react with the metals to convert them into a form that permits the metals to later be precipitated out as hydroxides. The sulfates generally accomplish this by reacting with the soluble metal ions and other metals present in the wastewater to convert them into metal sulfates and sulfides. Generally, some of these metal sulfates and most of these metal sulfides are insoluble, and the ones that are soluble may later be removed through hydroxide precipitation. By way of illustration, the generic chemistry involved in converting typical metal ions into sulfates is shown here, wherein $Me^+$ represents a free metal ion:

$$Me^+ + FeSO_4 \cdot 7H_2O + H_2SO_4 \rightarrow MeSO_4 + FeSO_4$$

The metal sulfates may then be precipitated out by hydroxide precipitation by adding a chemical such as caustic soda or lime:

In addition, sulfates play a large role in removing highly toxic hexavalent chromium from wastewater. The hexavalent chromium may be present in wastewater in the form of chromic acid, chromate, or dichromate. The sulfates reduce the hexavalent chromium ($Cr^{6+}$) to trivalent chromium ($Cr^{3+}$) the trivalent chromium typically being present as chromic sulfate. The chromic sulfate may then be precipitated out of the wastewater solution by hydroxide precipitation. Examples of the chemistry involved in removing hexavalent chromium from wastewater are as follows:

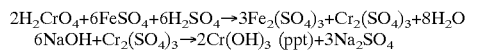

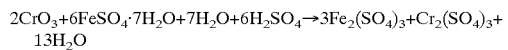

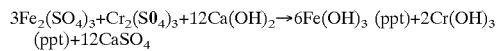

Again, the hydroxide precipitation reactions are shown, wherein caustic soda was used in the first example, and lime was used in the second example.

The sulfates also tend to break up highly soluble chelated metals to form metal sulfates and less soluble chelated metals and complexes at low pH levels. The less soluble chelated metals may then easily be removed through hydroxide precipitation at a higher pH level. The chemistry involved in breaking up chelates is as follows:

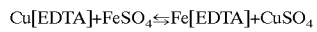

The Fe[EDTA] is a less soluble chelate than the Cu[EDTA]. When the pH level of the wastewater is increased, the Fe[EDTA] will disassociate and the Fe ions will be easily removable by hydroxide precipitation. The chelates will also be easily removable by chemical processes when free of the metal ions.

Another effect that the sulfates of the elixir have is that they tend to hydrolyze in the wastewater and aid in destabilizing any flocs that are present. The sulfates tend to neutralize negative surface charges that the flocs typically have, which then allows the flocs to aggregate into larger particles rather than repel one another.

The third compound that preferably comprises the elixir is an acid solution. In a preferred embodiment, an acid such as sulfuric acid is used. The acid tends to keep the pH of the wastewater at a low level which is needed for the sulfates to react with the metals to form metal sulfates and sulfides, and for the sulfates to break up any chelated metals and complexes. The acid also tends to provide ligands for the coagulants to bond with. In a presently preferred embodiment, a seventy-five percent concentrated solution of sulfuric acid is used.

The fourth compound in the elixir is preferably a chemical blend containing a polymeric coagulant and aluminum salts. In a preferred embodiment, the polymeric coagulant specifically comprises a cationic polyelectrolyte, for example, a polyquaternary amine, and the aluminum salt comprises aluminum sulfate. The presently preferred mixture has a boiling point of one hundred four point four degrees Celsius, a specific gravity of 1.31, a solubility in water of 100, and a vapor pressure of seventeen point five at twenty degrees Celsius. A presently preferred cationic polyelectrolyte and aluminum salts mixture for use in the present invention is the commercially available COAGULITE 200, produced by DuBois Chemicals, although other polymeric coagulant and aluminum salt blends may be used.

This fourth compound tends to bond to the metal sulfates and sulfides and precludes them from dissolving back into the solution in the event that the pH level of the wastewater changes. For example, the metal sulfates and sulfides will tend to bond to the carbon backbones of the polymers. Then if the pH level of the wastewater changes, the metal sulfates and sulfides will not dissolve back into the wastewater because they are bonded to the polymers. This fourth compound also facilitates inter-particle bridging to combine the flocs by acting as a charge neutralizer.

The elixir of the present invention is preferably produced by a batch process. The following is a description of the preferred method for manufacturing a forty-five gallon batch of the elixir. The quantities given may be scaled up or down depending on the needs of a user.

The manufacturing process preferably takes place in a forty-five gallon (204.57 liter) mixing tank with mechanical mixers. Preferably, the first step is to half fill the mixing tank with warm water. Next, the mixers are turned on at a slow rate.

The first ingredient, Ferrous Sulfate Heptahydrate ($FeSO_4$—$7H_2O$), is then slowly mixed into the water. Preferably, approximately twenty-five pounds (25 lbs.), or 11.325 kg, of Ferrous Sulfate Heptahydrate is added. After the ferrous sulfate heptahydrate has been added, the resulting solution is preferably allowed to continue mixing until it is all dispersed.

The second ingredient, Aluminum Sulfate (standard ground —$Al_2(SO_4)_3$—$14H_2O$), is then slowly added while continuing to run the mixer. Preferably, approximately twelve and one fourth pounds (12¼ lb.), or 5.55 kg, of aluminum sulfate is added. Once the aluminum sulfate has been added, the resulting solution is preferably allowed to continue mixing until all of the aluminum sulfate has dispersed. After this mixing period, the speed of the mixer should be reduced.

The third ingredient, 75% Sulfuric Acid ($H_2SO_4$), is added next. This compound is preferably poured slowly into the solution. Preferably a total of one U.S. gallon, or 3.785 liters, of the 75% Sulfuric Acid is used for the elixir. Once it has been added, the resulting solution is mixed until it is completely dispersed.

The fourth ingredient, a polymeric coagulant such as COAGULITE 200, is then added to the solution. Preferably a total of 0.341 liters of this fourth ingredient is added.

Finally, water is preferably added to bring the volume of the solution to forty-five gallons, or 204.57 liters. Upon completion of this process, one liter of the elixir of the present invention will generally comprise approximately 55.36 g of Ferrous Sulfate Heptahydrate, approximately 27.13 g of Aluminum Sulfate, approximately 22.22 ml of 75% Sulfuric Acid, and approximately 1.67 ml of COAGULITE 200. Preferably, the ratio of Ferrous Sulfate Heptahydrate:Aluminum Sulfate: Sulfuric Acid:COAGULATE 200 should be 28 to 35 grams:10 to 20 grams:10 to 16 milliliters:0.01 to 2.0 milliliters.

It will be appreciated by those of ordinary skill in the art of wastewater treatment that elixirs prepared simply by substituting solutions that are chemically similar to COAGULITE 200 into the present invention will still be encompassed within the scope of the claims. Accordingly, the above description should be construed as illustrative, and not in a limiting sense, the scope of the invention being defined by the following claims.

What is claimed:

1. An elixir for treating wastewater, consisting essentially of:

a mixture of water; ferrous sulfate;

aluminum sulfate;

a sulfuric acid solution; and a solution comprising an aluminum salt and a cationic polyelectrolyte coagulant.

2. The elixir of claim 1, wherein 28 to 35 grams of the ferrous sulfate is used for every 1 milliliter of the aluminum salt and cationic polyelectrolyte coagulant solution that is used.

3. The elixir of claim 1, wherein 10 to 20 grams of the aluminum sulfate is used for every 1 milliliter of the aluminum salt and cationic polyelectrolyte coagulant solution that is used.

4. The elixir of claim 1, wherein 10 to 16 milliliters of the acid solution is used for every 1 milliliter of the aluminum salt and cationic polyelectrolyte coagulant solution that is used.

5. The elixir of claim 1, wherein the ferrous sulfate comprises ferrous sulfate heptahydrate.

6. The elixir of claim 1, wherein the acid solution comprises 75% sulfuric acid.

7. A method of manufacturing the elixir of claim 1, comprising:

adding water to a mixing tank;

mixing the ferrous sulfate into the water;

mixing the aluminum sulfate into the water;

mixing the acid solution into the water;

mixing the solution of an aluminum salt and cationic polyelectrolyte coagulant into the water.

* * * * *